(12) United States Patent
Xiao et al.

(10) Patent No.: US 11,386,426 B2
(45) Date of Patent: Jul. 12, 2022

(54) INVOICE INVALIDATION METHOD AND APPARATUS BASED ON BLOCKCHAIN, AND ELECTRONIC DEVICE

(71) Applicant: Advanced New Technologies Co., Ltd., Grand Cayman (KY)

(72) Inventors: Hansong Xiao, Zhejiang (CN); Dongxu Li, Zhejiang (CN); Wenhu Kan, Zhejiang (CN); Ping Zhang, Zhejiang (CN); Zhen Sun, Zhejiang (CN); Jinming Duan, Zhejiang (CN); Liangrong Lin, Zhejiang (CN); Wei Chen, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/159,062

(22) Filed: Jan. 26, 2021

(65) Prior Publication Data

US 2021/0150517 A1 May 20, 2021

Related U.S. Application Data

(63) Continuation of application No. PCT/CN2019/115846, filed on Nov. 6, 2019.

(30) Foreign Application Priority Data

Dec. 27, 2018 (CN) .......................... 201811607413.0

(51) Int. Cl.
*G06Q 20/38* (2012.01)
*H04L 9/06* (2006.01)

(52) U.S. Cl.
CPC .......... *G06Q 20/389* (2013.01); *H04L 9/0618* (2013.01); *H04L 9/0643* (2013.01); *H04L 2209/38* (2013.01); *H04L 2209/56* (2013.01)

(58) Field of Classification Search
CPC . H04L 63/0876; H04L 63/062; H04L 9/0618; H04L 9/0643; H04L 2209/38;
(Continued)

(56) References Cited

U.S. PATENT DOCUMENTS 10,163,140 B2 * 12/2018 Robinson ........... G06Q 30/0283
10,169,808 B2 *  1/2019 Dhillon .............. G06Q 30/0635
(Continued)

FOREIGN PATENT DOCUMENTS

| CN | 105610578 A | 5/2016 |
|----|-------------|--------|
| CN | 106920098 A | 7/2017 |

(Continued)

OTHER PUBLICATIONS

Neisse et al., "A Blockchain-based Approach for Data Accountability and Provenance Tracking," ARES, 2017.
(Continued)

*Primary Examiner* — Oleg Korsak
(74) *Attorney, Agent, or Firm* — Seed IP Law Group LLP

(57) ABSTRACT

One or more implementations of the present specification provide an invoice invalidation method and apparatus based on a blockchain, and an electronic device. The method includes: receiving an invalidation request that is initiated by an invoice invalidation party for a target invoice recorded in the blockchain; in response to the invalidation request, determining whether the invoice invalidation party has authority to invalidate the target invoice; and in response to that the invoice invalidation party has the authority to invalidate the target invoice, invoking an invoice invalidation logic provided in a smart contract deployed in a blockchain network of the blockchain to invalidate the target invoice.

18 Claims, 5 Drawing Sheets

(58) Field of Classification Search
CPC . H04L 2209/56; H04L 9/3247; H04L 9/3239; G06Q 20/389; G06Q 20/102; G06Q 20/3827; G06Q 20/401; G06Q 30/018; G06Q 30/04; G06Q 40/04
See application file for complete search history.

(56) References Cited

U.S. PATENT DOCUMENTS

| | | | |
|---|---|---|---|
| 10,354,236 B1* | 7/2019 | Wang | G06Q 20/382 |
| 10,380,685 B1 | 8/2019 | Phillips et al. | |
| 10,497,037 B2* | 12/2019 | Isaacson | G06Q 20/12 |
| 10,715,331 B2* | 7/2020 | Davis | G06F 16/951 |
| 10,749,844 B2* | 8/2020 | Olivier | H04L 63/0421 |
| 10,764,752 B1* | 9/2020 | Avetisov | H04L 63/062 |
| 10,826,878 B2 | 11/2020 | Cox et al. | |
| 10,915,899 B2* | 2/2021 | Lopez | G06Q 20/4016 |
| 2005/0049968 A1* | 3/2005 | Porter | G06Q 20/102 705/40 |
| 2005/0071274 A1 | 3/2005 | Pfaff et al. | |
| 2007/0156535 A1 | 7/2007 | Hoffmann et al. | |
| 2008/0092239 A1 | 4/2008 | Sitrick et al. | |
| 2016/0292672 A1* | 10/2016 | Fay | G06Q 20/3829 |
| 2017/0148021 A1* | 5/2017 | Goldstein | H04L 63/0281 |
| 2017/0186057 A1* | 6/2017 | Metnick | G06Q 20/02 |
| 2018/0026979 A1 | 1/2018 | Cox et al. | |
| 2018/0268382 A1 | 9/2018 | Wasserman | |
| 2018/0341910 A1* | 11/2018 | Broveleit | G06Q 50/28 |
| 2018/0365686 A1* | 12/2018 | Kondo | H04L 63/123 |
| 2019/0098013 A1 | 3/2019 | Wilkinson | |
| 2019/0230070 A1* | 7/2019 | Isaacson | G07G 1/0036 |
| 2019/0260575 A1 | 8/2019 | Nenov et al. | |
| 2019/0392536 A1* | 12/2019 | Rice | H04L 67/22 |
| 2020/0005383 A1* | 1/2020 | Siddiqui | G06Q 30/04 |
| 2020/0027089 A1* | 1/2020 | Kuchar | H04L 63/123 |
| 2020/0067907 A1* | 2/2020 | Avetisov | H04L 9/0825 |
| 2020/0097967 A1* | 3/2020 | Patel | G06Q 20/06 |
| 2020/0118207 A1 | 4/2020 | Jovanovic | |
| 2020/0177604 A1 | 6/2020 | Wei et al. | |
| 2020/0294009 A1* | 9/2020 | Qing | G06Q 20/3678 |
| 2020/0402025 A1 | 12/2020 | Wang et al. | |
| 2021/0014060 A1 | 1/2021 | Georgiadis et al. | |

FOREIGN PATENT DOCUMENTS

| | | |
|---|---|---|
| CN | 106920169 A | 7/2017 |
| CN | 106952124 A | 7/2017 |
| CN | 107451874 A | 12/2017 |
| CN | 108305106 A | 7/2018 |
| CN | 108305216 A | 7/2018 |
| CN | 108805712 A | 11/2018 |
| CN | 108830600 A | 11/2018 |
| CN | 108876572 A | 11/2018 |
| CN | 108898389 A | 11/2018 |
| CN | 108922012 A | 11/2018 |
| CN | 108961030 A | 12/2018 |
| CN | 109636414 A | 4/2019 |
| CN | 110046900 A | 7/2019 |
| CN | 110060111 A | 7/2019 |
| TW | I610261 B | 1/2018 |
| TW | M556895 U | 3/2018 |
| WO | WO 2017194815 A1 | 11/2017 |
| WO | WO 2018127511 A1 | 7/2018 |
| WO | 2020/134614 A1 | 7/2020 |

OTHER PUBLICATIONS

Chen et al., "Blockchain-based Payment Collection Supervision System Using Pervasive Bitcoin Digital Wallet," Fifth International Workshop on Pervasive and Context-Aware Middleware, 2017, (pp. 139-146).

Aitawy et al., "Letanos: Blockchain-based Anpnymous Physical Delivery System," *15th Annual Conference on Privacy, Security and Trust*, 2017, (pp. 15-24).

English Translation of CN patent publication CN106952124A, Jul. 14, 2017.

* cited by examiner

US 11,386,426 B2

INVOICE INVALIDATION METHOD AND APPARATUS BASED ON BLOCKCHAIN, AND ELECTRONIC DEVICE

TECHNICAL FIELD

One or more implementations of the present specification relate to the field of blockchain technologies, and in particular, to an invoice invalidation method and apparatus based on a blockchain, and an electronic device.

DESCRIPTION OF THE RELATED ART

A blockchain technology, also known as a distributed ledger technology, is an emerging technology in which several computing devices participate in "bookkeeping" and jointly maintain a complete distributed database. Because the blockchain technology is characterized by being decentralized, open and transparent, enabling each computing device to participate in database recording, and enabling data synchronization to be performed quickly between the computing devices, the blockchain technology is used to build a decentralized system, and various executable programs are stored in the distributed database of the blockchain for automatic execution, which has been widely used in many fields.

BRIEF SUMMARY

The present specification provides an invoice invalidation method based on a blockchain, including: receiving an invalidation request that is initiated by an invoice invalidation party for a target invoice recorded in the blockchain; in response to the invalidation request, determining whether the invoice invalidation party has authority to invalidate the target invoice; and in response to that the invoice invalidation party has the authority to invalidate the target invoice, invoking an invoice invalidation logic provided in a smart contract deployed in a blockchain network of the blockchain to invalidate the target invoice.

In some implementations, the smart contract further provides authority verification logic for the invoice invalidation party; and the determining whether the invoice invalidation party has authority to invalidate the target invoice includes: invoking the authority verification logic provided in the smart contract to determine whether the invoice invalidation party has authority to invalidate the target invoice.

In some implementations, the invalidation request includes a user identifier of the invoice invalidation party; and the determining whether the invoice invalidation party has authority to invalidate the target invoice includes: determining, based on a user identifier, whether the invoice invalidation party is an issuer of the target invoice or a trusted third party; and in response to that the invoice invalidation party is an issuer of the target invoice or a trusted third party, determining that the invoice invalidation party has the authority to invalidate the target invoice.

In some implementations, the invalidation request includes an invoice identifier of the target invoice; and the method further includes: determining, based on an invoice identifier, whether an invoice corresponding to the invoice identifier is stored in the blockchain; and in response to that the invoice corresponding to the invoice identifier is stored in the blockchain, determining the invoice as the target invoice.

In some implementations, the invoice identifier includes: a hash value obtained through hash calculation based on an invoice content; or a hash value obtained through hash calculation based on a piece of uniqueness information in the invoice content.

In some implementations, the invalidating the target invoice includes: updating a state of the target invoice from a valid state to an invalid state.

The present specification further provides an invoice invalidation method based on a blockchain, including: obtaining a transaction that has been recorded in the blockchain; determining whether the transaction is a refund transaction corresponding to a payment transaction that has been recorded in the blockchain; and in response to that the transaction is a refund transaction corresponding to the payment transaction, invoking an invoice invalidation logic provided in a smart contract deployed in a blockchain network of the blockchain to invalidate a target invoice that is related to the payment transaction and recorded in the blockchain.

In some implementations, the smart contract further provides transaction matching logic; and the determining whether the transaction is a refund transaction corresponding to the payment transaction that has been recorded in the blockchain includes: invoking the transaction matching logic provided in the smart contract to determine whether the transaction is a refund transaction corresponding to the payment transaction that has been recorded in the blockchain.

In some implementations, the method further includes: determining, based on an invoice identifier corresponding to the payment transaction, whether an invoice corresponding to the invoice identifier is stored in the blockchain; and in response to that the invoice corresponding to the invoice identifier is stored in the blockchain, determining the invoice as the target invoice.

In some implementations, the invoice identifier includes: a hash value obtained through hash calculation based on an invoice content; or a hash value obtained through hash calculation based on a piece of uniqueness information in the invoice content.

In some implementations, the invalidating the target invoice that is related to the payment transaction and recorded in the blockchain includes: updating a state of the target invoice that is related to the payment transaction and recorded in the blockchain from a valid state to an invalid state.

The present specification further provides an invoice invalidation apparatus based on a blockchain, including: a receiving module, configured to receive an invalidation request that is initiated by an invoice invalidation party for a target invoice recorded in the blockchain; a first determining module, configured to: in response to the invalidation request, determine whether the invoice invalidation party has authority to invalidate the target invoice; and an invalidation module, configured to: in response to that the invoice invalidation party has the authority to invalidate the target invoice, invoke an invoice invalidation logic provided in a smart contract deployed in a blockchain network of the blockchain to invalidate the target invoice.

In some implementations, the smart contract further provides authority verification logic for the invoice invalidation party; and the first determining module is specifically configured to: invoke the authority verification logic provided in the smart contract to determine whether the invoice invalidation party has authority to invalidate the target invoice.

In some implementations, the invalidation request includes a user identifier of the invoice invalidation party; and the first determining module is specifically configured to: determine, based on the user identifier, whether the invoice invalidation party is an issuer of the target invoice or a trusted third party; and in response to that the invoice invalidation party is an issuer of the target invoice or a trusted third party, determine that the invoice invalidation party has the authority to invalidate the target invoice.

In some implementations, the invalidation request includes an invoice identifier of the target invoice; and the apparatus further includes: a second determining module, configured to: determine, based on an invoice identifier, whether an invoice corresponding to the invoice identifier is stored in the blockchain; and a third determining module, configured to: when the invoice corresponding to the invoice identifier is stored in the blockchain, determine the invoice as the target invoice.

In some implementations, the invoice identifier includes: a hash value obtained through hash calculation based on an invoice content; or a hash value obtained through hash calculation based on a piece of uniqueness information in the invoice content.

In some implementations, the invalidation module is specifically configured to: update a state of the target invoice from a valid state to an invalid state.

The present specification further provides an invoice invalidation apparatus based on a blockchain, including: an acquisition module, configured to obtain a transaction that has been recorded in the blockchain; a first determining module, configured to determine whether the transaction is a refund transaction corresponding to a payment transaction that has been recorded in the blockchain; and an invalidation module, configured to: when the transaction is a refund transaction corresponding to the payment transaction, invoke an invoice invalidation logic provided in a smart contract deployed in a blockchain network of the blockchain to invalidate a target invoice that is related to the payment transaction and recorded in the blockchain.

In some implementations, the smart contract further provides transaction matching logic; and the first determining module is specifically configured to: invoke the transaction matching logic provided in the smart contract to determine whether the transaction is a refund transaction corresponding to the payment transaction that has been recorded in the blockchain.

In some implementations, the apparatus further includes: a second determining module, configured to: determine, based on an invoice identifier corresponding to the payment transaction, whether an invoice corresponding to the invoice identifier is stored in the blockchain; and a third determining module, configured to: when the invoice corresponding to the invoice identifier is stored in the blockchain, determine the invoice as the target invoice.

In some implementations, the invoice identifier includes: a hash value obtained through hash calculation based on an invoice content; or a hash value obtained through hash calculation based on a piece of uniqueness information in the invoice content.

In some implementations, the invalidation module is specifically configured to: update a state of the target invoice that is related to the payment transaction and recorded in the blockchain from a valid state to an invalid state.

The present specification further provides an electronic device, including: a processor; and a memory configured to store machine-executable instructions; where by reading and executing the machine-executable instructions stored in the memory and corresponding to control logic for invoice invalidation based on a blockchain, the processor is enabled to: receive an invalidation request that is initiated by an invoice invalidation party for a target invoice recorded in the blockchain; in response to the invalidation request, determine whether the invoice invalidation party has authority to invalidate the target invoice; and in response to that the invoice invalidation party has the authority to invalidate the target invoice, invoke an invoice invalidation logic provided in a smart contract deployed in a blockchain network of the blockchain to invalidate the target invoice.

The present specification further provides an electronic device, including: a processor; and a memory configured to store machine-executable instructions; where by reading and executing the machine-executable instructions stored in the memory and corresponding to control logic for invoice invalidation based on a blockchain, the processor is enabled to: obtain a transaction that has been recorded in the blockchain; determine whether the transaction is a refund transaction corresponding to a payment transaction that has been recorded in the blockchain; and in response to that the transaction is a refund transaction corresponding to the payment transaction, invoke an invoice invalidation logic provided in a smart contract deployed in a blockchain network of the blockchain to invalidate a target invoice that is related to the payment transaction and recorded in the blockchain.

In the above technical solutions, when an invoice invalidation party initiates an invalidation request on a certain invoice recorded in a blockchain, corresponding logic in a smart contract deployed in a blockchain network of the blockchain is invoked to verify invalidation authority of the invoice invalidation party, and when it is determined that the invoice invalidation party has the authority to invalidate the invoice, the invoice is invalidated. Alternatively, when it is determined that a certain transaction that has been recorded in a blockchain is a refund transaction corresponding to a payment transaction that has been recorded in the blockchain, corresponding logic in a smart contract deployed in a blockchain network of the blockchain is invoked to invalidate an invoice that is related to the payment transaction and recorded in the blockchain. As such, the invoice recorded in the blockchain is invalidated, and the data security of invoices circulating in the blockchain is ensured.

DETAILED DESCRIPTION

Figure 1:
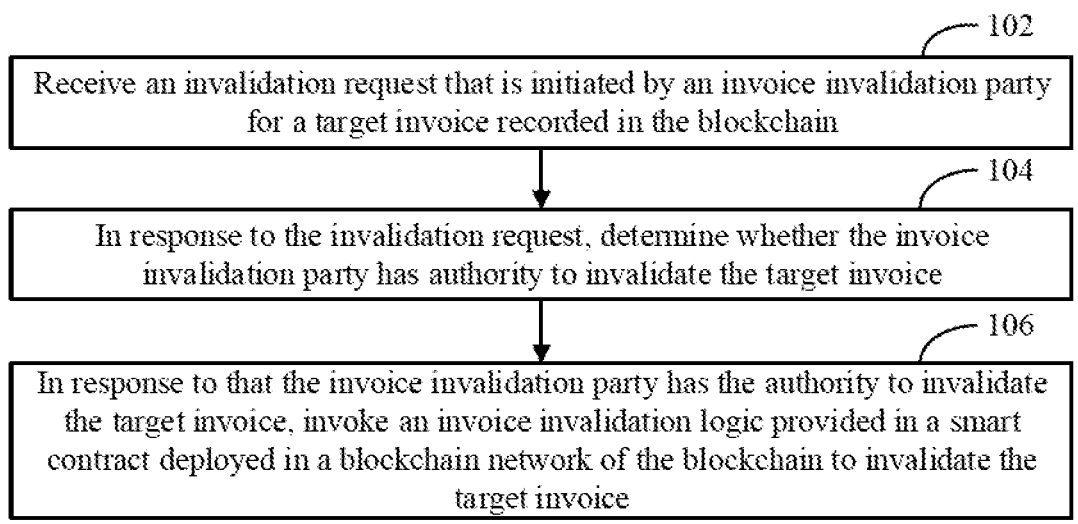
FIG. 1 is a flowchart illustrating an invoice invalidation method based on a blockchain according to some example implementations of the present specification.

Example implementations are described in detail herein, and examples thereof are shown in the accompanying drawings. When the following description refers to the accompanying drawings, unless otherwise indicated, the same numbers in different accompanying drawings refer to the same or similar elements. The following example implementations do not represent all implementations consistent with one or more implementations of the present specification. In contrast, they are merely examples of apparatuses and methods consistent with some aspects of one or more implementations of the present specification as described in detail in the appended claims.

Terms used in the present specification are for the purpose of describing specific implementations only and are not intended to limit the present specification. As used in the present specification and the appended claims, the singular forms "a (an)," "the" and "this" are also intended to include the plural forms, unless the context clearly indicates other meaning. It should also be understood that the term "and/or" as used herein refers to and includes any or all possible combinations of one or more associated listed items.

It should be understood that although the terms such as "first," "second," and "third" can be used to describe various types of information in the present specification, the information should not be limited to these terms. These terms are only used to differentiate information of a same type. For example, without departing from the scope of the present specification, the first information can also be called second information, and similarly, the second information can also be called first information. Depending on the context, the word "if" as used herein can be explained as "when" or "in response to determining."

The present specification provides technical solutions for invalidating an invoice recorded in a blockchain.

In some implementations, when a user needs to invalidate a certain invoice recorded in a blockchain of a blockchain network, the user (called invoice invalidation party) can initiate an invalidation request on the invoice (called target invoice) by using a client.

After receiving the invalidation request, a node device in the blockchain network can respond to the invalidation request.

Specifically, it can be determined first whether the invoice invalidation party has authority to invalidate the target invoice. Generally, only an invoice issuer or a trusted third party (such as a tax bureau or an industrial and commercial bureau) is allowed to invalidate a certain invoice, so as to ensure the data security of the invoice and prevent the invoice from being maliciously invalidated. In this case, it can be first determined whether the invoice invalidation party that initiated the invalidation request has authority to invalidate the target invoice. In response to that the invoice invalidation party is an issuer of the invoice or a trusted third party, it can be determined that the invoice invalidation party has the authority to invalidate the invoice.

After it is determined that the invoice invalidation party has the authority to invalidate the invoice, the node device can invoke an invoice invalidation logic provided in a smart contract deployed, e.g., in the blockchain network to invalidate the target invoice recorded in the blockchain.

In some other implementations, after completing a payment or refund, a user can record the payment transaction or refund transaction in a blockchain. A node device in the blockchain network can obtain a transaction that has been recorded in the blockchain, and determine whether the transaction is a refund transaction corresponding to a certain payment transaction that has been recorded in the blockchain.

For example, it can be checked whether transaction objects and transaction content (such as transaction amount and transaction items) in the transaction match the transaction objects and transaction content of each payment transaction that has been recorded in the blockchain. In response to that the payer of the transaction is a payee of another payment transaction that has been recorded in the blockchain, the payee of the transaction is a payer of the other payment transaction, and the transaction content of the transaction is the same as that of the other payment transaction, it can be determined that the transaction is a refund transaction corresponding to the payment transaction.

After it is determined that the transaction is a refund transaction corresponding to a certain payment transaction that has been recorded in the blockchain, a node device can invoke an invoice invalidation logic provided in a smart contract deployed in the blockchain network to invalidate a target invoice that is related to the payment transaction and recorded in the blockchain.

In the above technical solutions, when an invoice invalidation party initiates an invalidation request on a certain invoice recorded in a blockchain, corresponding logic in a smart contract deployed in a blockchain network of the blockchain is invoked to verify invalidation authority of the invoice invalidation party, and when it is determined that the invoice invalidation party has the authority to invalidate the invoice, the invoice is invalidated. Alternatively, when it is determined that a certain transaction that has been recorded in a blockchain is a refund transaction corresponding to a payment transaction that has been recorded in the blockchain, corresponding logic in a smart contract deployed in a blockchain network of the blockchain is invoked to invalidate an invoice that is related to the payment transaction and recorded in the blockchain. As such, the invoice recorded in the blockchain is invalidated, and the data security of invoices circulating in the blockchain is ensured.

The present specification is further described below with reference to specific implementations.

FIG. 1 is a flowchart illustrating an invoice invalidation method based on a blockchain according to some example implementations of the present specification. The method can be applied to a node device in a blockchain network, and includes the following steps.

Step 102: Receive an invalidation request that is initiated by an invoice invalidation party for a target invoice recorded in the blockchain.

Step 104: In response to the invalidation request, determine whether the invoice invalidation party has authority to invalidate the target invoice.

Step 106: in response to that the invoice invalidation party has the authority to invalidate the target invoice, invoke an invoice invalidation logic provided in a smart contract deployed in a blockchain network of the blockchain to invalidate the target invoice.

The blockchain network described in the present specification can specifically include any type of blockchain network. For example, in practice, any one of a public blockchain, a private blockchain and a consortium blockchain network can be used.

Because data stored in a blockchain cannot be tampered with, it has become the mainstream trend in the industry to store the data in the blockchain for data record, i.e., to store data as record in the blockchain.

In the implementations, the invoice can be recorded in the blockchain.

When an invoice invalidation party needs to invalidate a target invoice recorded in the blockchain, the invoice invalidation party can initiate, by using a client, a transaction for invalidating the target invoice, e.g., initiate an invalidation request on the target invoice by using the client.

Transactions in the blockchain are divided into transactions in narrow meanings and transactions in broad meanings. In narrow meanings, a transaction refers to a value transfer deployed by a user to the blockchain. For example, in a conventional bitcoin blockchain network, a transaction can be a transfer initiated by a user in the blockchain. In broad meanings, a transaction refers to a piece of service or business data with a service or business intention published by a user to the blockchain. For example, the operator can build a consortium blockchain based on actual service requirements, and deploy, based on the consortium blockchain, some other online services unrelated to value transfer (such as a rental service, a vehicle dispatching service, an insurance claims service, a credit service, and a medical service). In this consortium blockchain, the transaction can be a service/business message or service request with a service/business intention published by the user in the consortium blockchain.

After receiving the invalidation request, a node device in the blockchain can respond to the invalidation request.

Specifically, it can be determined first whether the invoice invalidation party has authority to invalidate the target invoice.

If it is determined that the invoice invalidation party has the authority to invalidate the target invoice, invoice invalidation logic provided in a smart contract deployed in a blockchain network of the blockchain can be invoked to invalidate the target invoice.

The invoice invalidation logic can be program code (such as some program methods or functions that can be invoked) that is provided in the smart contract and related to execution logic for invalidating an invoice.

In practice, the above smart contract can further provide authority verification logic for the above invoice invalidation party. In this case, the authority verification logic provided in the smart contract can be invoked to determine whether the invoice invalidation party has the above authority to invalidate the target invoice.

The authority verification logic can be specifically program code that is provided in the smart contract and related to execution logic for verifying invalidation authority of an invoice invalidation party.

It should be noted that the smart contract for invoice invalidation described above and the smart contract for verifying invalidation authority of an invoice invalidation party can be integrated into one smart contract and deployed in the above blockchain, or can be deployed in the blockchain as two different smart contracts, which is not limited in the present specification.

In some illustrated implementations, the invalidation request that is initiated by the invoice invalidation party for the target invoice by using the client can include a user identifier of the invoice invalidation party, so that it can be determined, based on the user identifier of the invoice invalidation party, whether the invoice invalidation party has the authority to invalidate the target invoice.

For example, by checking whether the user identifier of the invoice invalidation party matches a user identifier of an issuer of the target invoice, it can be determined whether the invoice invalidation party is the issuer of the target invoice. In response to that the user identifier of the invoice invalidation party is the same as the user identifier of the issuer of the target invoice, it can be determined that the invoice invalidation party is the issuer of the target invoice, and thus it can be determined that the invalidation party has the authority to invalidate the target invoice.

For example, by checking whether the user identifier of the invoice invalidation party matches a user identifier of a trusted third party, it can be determined whether the invoice invalidation party is the trusted third party. In response to that the user identifier of the invoice invalidation party is the same as the user identifier of the trusted third party, it can be determined that the invoice invalidation party is the trusted third party, and thus it can be determined that the invoice invalidation party has the authority to invalidate the target invoice.

Accordingly, in response to that it is determined that the invoice invalidation party is neither the issuer of the target invoice nor the trusted third party, it can be determined that the invoice invalidation party does not have the authority to invalidate the target invoice. In this case, the target invoice cannot be subsequently invalidated.

The user identifier can be a taxpayer identification number, or an institution code of a trusted third party such as a tax bureau or an industrial and commercial bureau; alternatively, the user identifier can be a user number assigned to an individual, an enterprise or a tax bureau, and user numbers assigned to different users are different, which is not limited in the present specification.

For example, the user identifier can be a taxpayer identification number. After the invalidation request that is initiated for the target invoice and includes the user identifier of the invoice invalidation party is received, the taxpayer identification number of the invoice issuer can be obtained from the target invoice first, and then it is checked whether the obtained taxpayer identification number of the invoice issuer matches the user identifier of the invoice invalidation party. In response to that the taxpayer identification number of the invoice issuer is same as the user identifier of the invoice invalidation party, it can be determined that the invoice invalidation party is the issuer of the target invoice, and thus it can be determined that the invalidation party has the authority to invalidate the target invoice.

For example, the user identifier can be an institution code of a trusted third party such as a tax bureau or an industrial and commercial bureau. After the invalidation request that is initiated for the target invoice and includes the user identifier of the invoice invalidation party is received, it can be checked whether the institution code of each trusted third party matches the user identifier of the invoice invalidation party. In response to that the user identifier of the invoice invalidation party is the same as the institution code of a certain trusted third party, it can be determined that the invoice invalidation party is the trusted third party, and thus it can be determined that the invoice invalidation party has the authority to invalidate the target invoice.

In another example, when an invoice is recorded in a blockchain, as, e.g., described above, the user identifier of the invoice issuer or the trusted third party with the authority to invalidate the invoice can be correspondingly recorded in the blockchain.

After the invalidation request that is initiated for the target invoice and includes the user identifier of the invoice invalidation party is received, it can be checked whether the user identifier of the invoice invalidation party matches a user identifier corresponding to the target invoice. In response to that the user identifier of the invoice invalidation party is the same as a certain user identifier corresponding to the target invoice, it can be determined that the invoice invalidation party has the authority to invalidate the target invoice.

For example, assuming that a user identifier of a certain trusted third party is user identifier 1, a user identifier of an issuer of invoice 1 is user identifier 2, and a user identifier of an issuer of invoice 2 is user identifier 2, then the invoice and the user identifier of the invoice issuer or trusted third party with the authority to invalidate the invoice can be recorded in the blockchain in the form shown in Table 1.

TABLE 1

| Invoice | User identifier |
|---|---|
| Invoice 1 | User identifier 1 |
| | User identifier 2 |
| Invoice 2 | User identifier 1 |
| | User identifier 3 |
| . . . | . . . |

After an invalidation request that is initiated for invoice 1 and includes user identifier 1 is received, it can be determined, based on Table 1, that the invoice invalidation party initiating the invalidation request has the authority to invalidate invoice 1; after an invalidation request that is initiated for invoice 1 and includes user identifier 3 is received, it can be determined, based on Table 1, that the invoice invalidation party initiating the invalidation request does not have the authority to invalidate invoice 1; and so on.

In some illustrated implementations, the invalidation request that is initiated by the invoice invalidation party for the target invoice by using the client can include an invoice identifier of the target invoice, so that based on the invoice identifier of the target invoice, it can be first determined whether the target invoice has been recorded in the blockchain, and when it is determined that the target invoice has been recorded in the blockchain, it can be determined whether the invoice invalidation party has the authority to invalidate the target invoice, so as to avoid invalid operation when the target invoice has not been recorded in the blockchain, and reduce device resource consumption.

For example, when an invoice is recorded in the blockchain, the invoice identifier of the invoice can be correspondingly recorded in the blockchain.

After the invalidation request that is initiated for the target invoice and includes the invoice identifier of the target invoice is received, it can be checked whether the invoice identifier of the target invoice matches an invoice identifier of an invoice that has been recorded in the blockchain. In response to that the invoice identifier of the invoice is the same as an invoice identifier of a certain invoice that has been recorded in the blockchain, it can be determined that the blockchain stores an invoice corresponding to the invoice identifier, and the invoice is determined as the target invoice. Subsequently, it can be determined whether the invoice invalidation party has authority to invalidate the target invoice.

Accordingly, in response to that it is determined that the blockchain does not store an invoice corresponding to the invoice identifier, it is no longer necessary to determine whether the invoice invalidation party has the authority to invalidate the target invoice.

The invoice identifier can be a hash value obtained through hash calculation based on an invoice content; or a hash value obtained through hash calculation based on a piece of uniqueness information (such as an invoice number and an invoice code) in the invoice content.

For example, assuming that an invoice identifier of invoice 1 is invoice identifier 1 and an invoice identifier of invoice 2 is invoice identifier 2, the invoice 1, the invoice identifier 1, the invoice 2, and the invoice identifier 2 can be recorded in the blockchain in the form shown in Table 2.

TABLE 2

| Invoice | Invoice identifier |
|---|---|
| Invoice 1 | Invoice identifier 1 |
| Invoice 2 | Invoice identifier 2 |
| . . . | . . . |

Assuming that only invoice 1 and invoice 2 are recorded in this blockchain, after an invalidation request that is initiated for invoice 1 and includes invoice identifier 1 is received, it can be determined, based on Table 2, that the blockchain stores invoice 1 corresponding to invoice identifier 1, and invoice 1 is determined as the target invoice; and after an invalidation request that is initiated for invoice 3 and includes invoice identifier 3 is received, it can be determined, based on Table 2, that the blockchain does not store invoice 3 corresponding to invoice identifier 3; and so on.

In some illustrated implementations, because data stored in the blockchain cannot be tampered with, the target invoice can be invalidated by updating a state of the target invoice from a valid state to an invalid state.

For example, when the target invoice is recorded in the blockchain, a state identifier for representing that the target invoice is valid can further be set for the target invoice, that is, the state of the target invoice is a valid state at this time. Subsequently, when it is determined that the target invoice needs to be invalidated, the state identifier of the target invoice can be updated to represent that the target invoice is invalid, that is, the state of the target invoice is updated from a valid status to an invalid state.

The state identifier can be a specific byte set for the invoice, which is not limited in the present specification.

In the above technical solutions, when an invoice invalidation party initiates an invalidation request on a certain invoice recorded in a blockchain, corresponding logic in a smart contract deployed in a blockchain network of the blockchain is invoked to verify invalidation authority of the invoice invalidation party, and when it is determined that the invoice invalidation party has the authority to invalidate the invoice, the invoice is invalidated. As such, the invoice recorded in the blockchain is invalidated, and the data security of invoices circulating in the blockchain is ensured.

Figure 2:
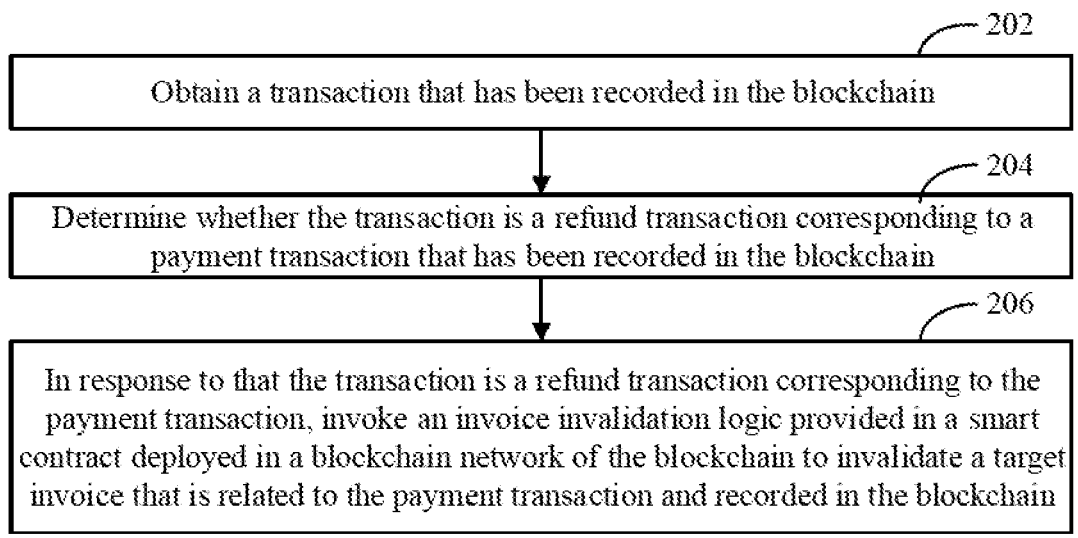
FIG. 2 is a flowchart illustrating another invoice invalidation method based on a blockchain according to some example implementations of the present specification.

FIG. 2 is a flowchart illustrating another invoice invalidation method based on a blockchain according to some example implementations of the present specification. The method can be applied at a node device in a blockchain network, and includes the following steps.

Step 202: Obtain a transaction that has been recorded in the blockchain.

Step 204: Determine whether the transaction is a refund transaction corresponding to a payment transaction that has been recorded in the blockchain.

Step 206: In response to that the transaction is a refund transaction corresponding to the payment transaction, invoke an invoice invalidation logic provided in a smart contract deployed in a blockchain network of the blockchain to invalidate a target invoice that is related to the payment transaction and recorded in the blockchain.

In the implementations, after completing a payment or refund, a user can record the payment transaction or refund transaction in a blockchain.

A node device in the blockchain can obtain a transaction that has been recorded in the blockchain, and determine whether the transaction is a refund transaction corresponding to a certain payment transaction that has been recorded in the blockchain.

Specifically, newly-added transactions that have been recorded in the blockchain can be acquired regularly based on a certain time interval, and it is determined whether each transaction is a refund transaction corresponding to a certain payment transaction that has been recorded in the blockchain separately; alternatively or additionally, when a new transaction record is added in the blockchain, it can be immediately determined whether the transaction is a refund transaction corresponding to a certain payment transaction that has been recorded in the blockchain, which is not limited in the present specification.

In practice, it can be checked whether obtained transaction information such as transaction objects and transaction content matches corresponding transaction information of a payment transaction that has been recorded in the blockchain.

The transaction objects include a payer and a payee of a transaction, and transaction content can include transaction amount, transaction items, and the like.

If the payer of a transaction is the payee of another payment transaction that has been recorded in the blockchain, the payee of the transaction is the payer of the other payment transaction, and the transaction content of the transaction is the same as that of the payment transaction, it can be determined that the transaction is a refund transaction corresponding to the other payment transaction.

If it is determined that the obtained transaction is a refund transaction corresponding to a certain payment transaction that has been recorded in the blockchain, invoice invalidation logic provided in a smart contract deployed in the blockchain network can be invoked to invalidate a target invoice that is related to the payment transaction and recorded in the blockchain.

The invoice invalidation logic can be, for example, program code that is provided in the smart contract and related to execution logic for invalidating an invoice.

In practice, the above smart contract can further provide transaction matching logic. In this case, authority verification logic provided in the smart contract can be invoked to determine whether the above obtained transaction is a refund transaction corresponding to a certain payment transaction that has been recorded in the blockchain.

Transaction matching logic can specifically be program code that is provided in the smart contract and related to execution logic for matching with transaction information in a transaction.

It should be noted that the smart contract for invoice invalidation described above and the smart contract for matching with transaction information in a transaction can be integrated into one smart contract and deployed in the above blockchain, or can be deployed in the blockchain as two different smart contracts, which is not limited in the present specification.

In some illustrated implementations, after it is determined that the above obtained transaction is a refund transaction corresponding to a certain payment transaction that has been recorded in the above blockchain, based on an invoice identifier corresponding to the transaction, it can be first determined whether a target invoice related to the payment transaction has been recorded in the blockchain, and when it is determined that the target invoice has been recorded in the blockchain, invoice invalidation logic provided in a smart contract deployed in the blockchain network, e.g., stored in a blockchain of the blockchain network, can be invoked to invalidate the target invoice, so as to avoid invalid operation when the target invoice has not been recorded in the blockchain, and reduce device resource consumption.

For example, when an invoice issued for a certain payment transaction is recorded in the blockchain, the invoice identifier of the invoice can be correspondingly recorded in the blockchain. In addition, a corresponding relationship between the invoice identifier of the invoice and the payment transaction can further be recorded in the blockchain.

After it is determined that the refund transaction corresponding to the payment transaction is obtained, the invoice identifier corresponding to the payment transaction can be obtained, and it is checked whether the invoice identifier matches the invoice identifier of each invoice that has been recorded in the blockchain. In response to that the invoice identifier of the invoice is the same as an invoice identifier of a certain invoice that has been recorded in the blockchain, it can be determined that the blockchain stores an invoice corresponding to the invoice identifier, and the invoice is determined as the target invoice. Subsequently, the target invoice can be invalidated.

Accordingly, in response to that it is determined that the blockchain does not store an invoice corresponding to the invoice identifier, the target invoice that is related to the payment transaction and recorded in the blockchain no longer needs to be invalidated.

The invoice identifier can be a hash value obtained through hash calculation based on an invoice content; or a hash value obtained through hash calculation based on a piece of uniqueness information (such as an invoice number and an invoice code) in the invoice content.

In practice, the invoice issued for a certain payment transaction and the payment transaction can be directly recorded in the blockchain. As such, after it is determined that the refund transaction corresponding to the payment transaction is obtained, it can be directly determined whether the blockchain stores a target invoice related to the payment transaction.

In some illustrated implementations, because data stored in the blockchain cannot be tampered with, the target invoice can be invalidated by updating a state of the target invoice from a valid state to an invalid state.

For example, when the target invoice is recorded in the blockchain, a state identifier for representing that the target invoice is valid can further be set for the target invoice, that is, the state of the target invoice is a valid state at this time. Subsequently, when it is determined that the target invoice needs to be invalidated, the state identifier of the target invoice can be updated to represent that the target invoice is invalid, that is, the state of the target invoice is updated from a valid status to an invalid state.

The state identifier can be a specific byte set for the invoice, which is not limited in the present specification.

In the above technical solutions, when it is determined that a certain transaction that has been recorded in a blockchain is a refund transaction corresponding to another payment transaction that has been recorded in the blockchain, corresponding logic in a smart contract deployed in the blockchain network is invoked to invalidate an invoice that is related to the other payment transaction and recorded in the blockchain. As such, the invoice recorded in the blockchain is invalidated, and the data security of invoices circulating in the blockchain is ensured.

Corresponding to the above implementations of the invoice invalidation method based on a blockchain, the present specification further provides implementations of the invoice invalidation apparatus based on a blockchain.

Figure 3:
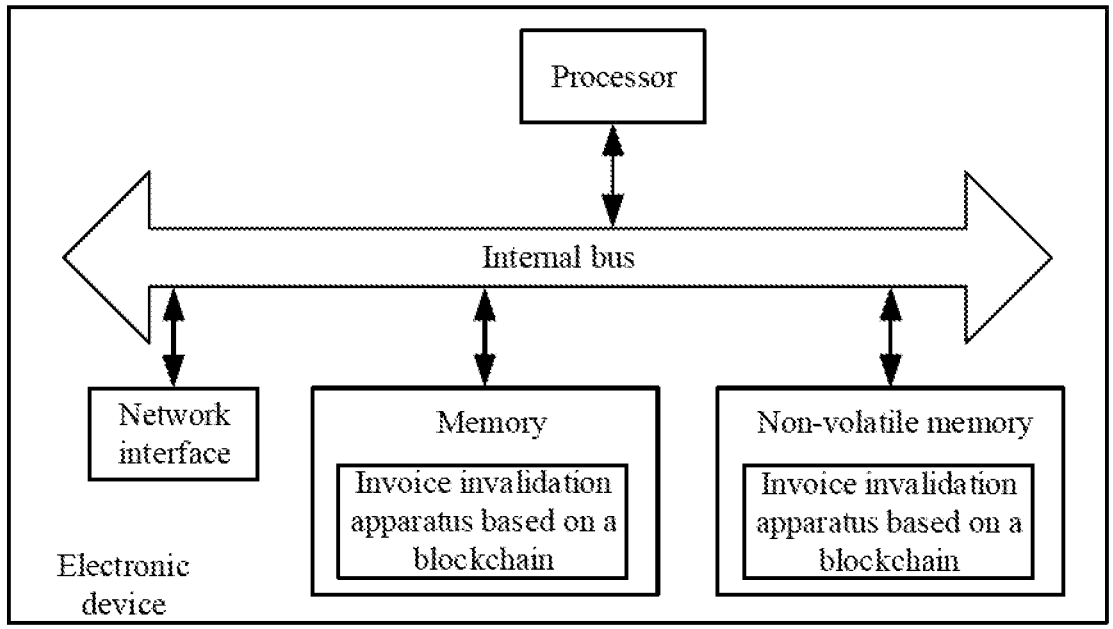
FIG. 3 is a diagram illustrating a hardware structure of an electronic device where an invoice invalidation apparatus based on a blockchain is located according to some example implementations of the present specification.

The implementations of the invoice invalidation apparatus based on a blockchain according to the present specification can be applied to an electronic device. The apparatus implementations can be implemented by using software, hardware, or a combination thereof. Taking software implementation as an example, a logical apparatus is implemented by reading, by using a processor of an apparatus device where the apparatus is located, corresponding computer program instructions in a non-volatile memory into a memory for running. On the hardware level, FIG. 3 is a diagram illustrating a hardware structure of an electronic device where an invoice invalidation apparatus based on a blockchain is located according to the present specification. In addition to a processor, a memory, a network interface, and a non-volatile memory shown in FIG. 3, the electronic device where the apparatus according to the implementations is located can generally further include other hardware depending on the actual invoice invalidation function based on a blockchain. Details are omitted for simplicity.

Figure 4:
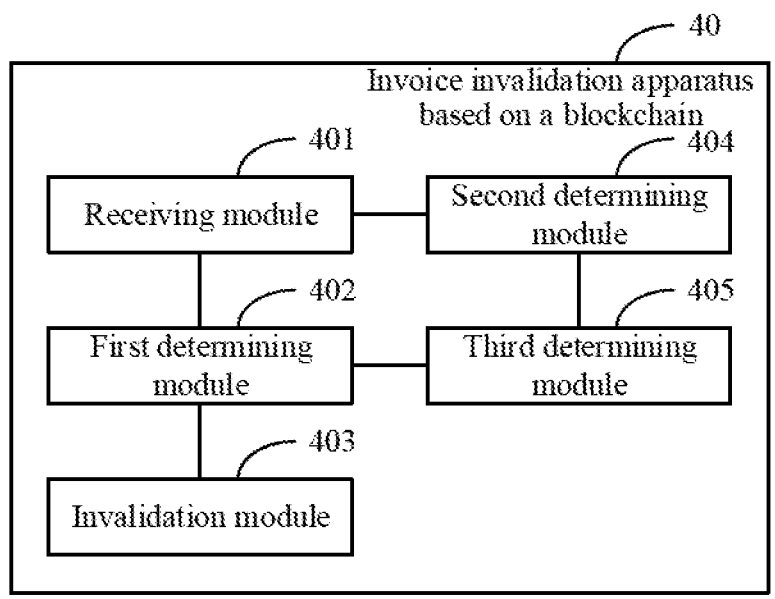
FIG. 4 is a block diagram illustrating an invoice invalidation apparatus based on a blockchain according to some example implementations of the present specification.

FIG. 4 is a block diagram illustrating an invoice invalidation apparatus based on a blockchain according to some example implementations of the present specification. The apparatus 40 can be applied to the electronic device shown in FIG. 3, and includes: a receiving module 401, configured to receive an invalidation request that is initiated by an invoice invalidation party for a target invoice recorded in the blockchain; a first determining module 402, configured to: in response to the invalidation request, determine whether the invoice invalidation party has authority to invalidate the target invoice; and an invalidation module 403, configured to: in response to that the invoice invalidation party has the authority to invalidate the target invoice, invoke an invoice invalidation logic provided in a smart contract deployed in a blockchain network of the blockchain to invalidate the target invoice.

In the implementations, the smart contract can further provide authority verification logic for the invoice invalidation party; and the first determining module 402 can be specifically configured to: invoke the authority verification logic provided in the smart contract to determine whether the invoice invalidation party has authority to invalidate the target invoice.

In the implementations, the invalidation request can include a user identifier of the invoice invalidation party; the first determining module 402 can be specifically configured to: determine, based on the user identifier, whether the invoice invalidation party is an issuer of the target invoice or a trusted third party; and in response to that the invoice invalidation party is an issuer of the target invoice or a trusted third party, determine that the invoice invalidation party has the authority to invalidate the target invoice.

In the implementations, the invalidation request can include an invoice identifier of the target invoice; the apparatus 40 can further include: a second determining module 404, configured to: determine, based on an invoice identifier, whether an invoice corresponding to the invoice identifier is stored in the blockchain; and a third determining module 405, configured to: when the invoice corresponding to the invoice identifier is stored in the blockchain, determine the invoice as the target invoice.

In the implementations, the invoice identifier can include: a hash value obtained through hash calculation based on an invoice content; or a hash value obtained through hash calculation based on a piece of uniqueness information in the invoice content.

In the implementations, the invalidation module 403 can be specifically configured to: update a state of the target invoice from a valid state to an invalid state.

Figure 5:
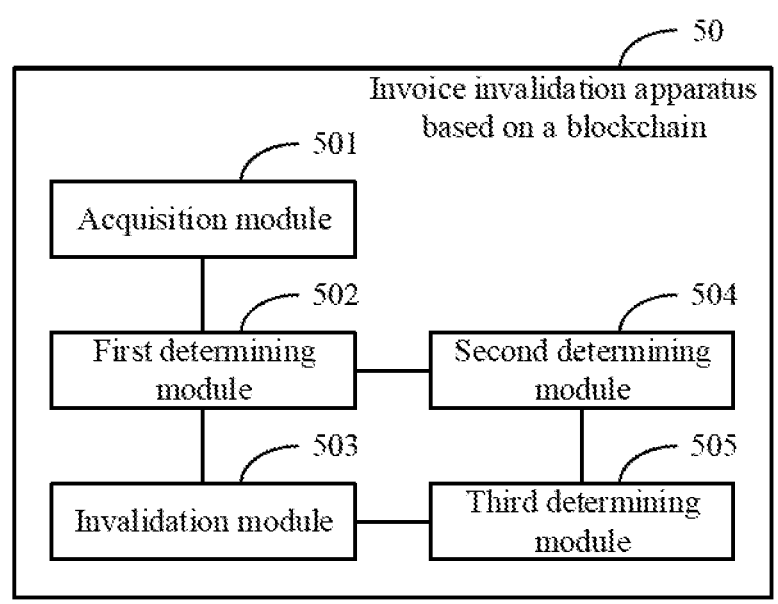
FIG. 5 is a block diagram illustrating another invoice invalidation apparatus based on a blockchain according to some example implementations of the present specification.

FIG. 5 is a block diagram illustrating another invoice invalidation apparatus based on a blockchain according to some example implementations of the present specification. The apparatus 50 can be applied to the electronic device shown in FIG. 3, and includes: an acquisition module 501, configured to obtain a transaction that has been recorded in the blockchain; a first determining module 502, configured to determine whether the transaction is a refund transaction corresponding to a payment transaction that has been recorded in the blockchain; and an invalidation module 503, configured to: when the transaction is a refund transaction corresponding to the payment transaction, invoke an invoice invalidation logic provided in a smart contract deployed in a blockchain network of the blockchain to invalidate a target invoice that is related to the payment transaction and recorded in the blockchain.

In the implementations, the smart contract can further provide transaction matching logic; and the first determining module 502 can be specifically configured to: invoke the transaction matching logic provided in the smart contract to determine whether the transaction is a refund transaction corresponding to the payment transaction that has been recorded in the blockchain.

In the implementations, the apparatus 50 can further include: a second determining module 504, configured to: determine, based on an invoice identifier corresponding to the payment transaction, whether an invoice corresponding to the invoice identifier is stored in the blockchain; and a third determining module 505, configured to: when the invoice corresponding to the invoice identifier is stored in the blockchain, determine the invoice as the target invoice.

In the implementations, the invoice identifier can include: a hash value obtained through hash calculation based on an invoice content; or a hash value obtained through hash calculation based on a piece of uniqueness information in the invoice content.

In the implementations, the invalidation module 503 can be specifically configured to: update a state of the target invoice that is related to the payment transaction and recorded in the blockchain from a valid state to an invalid state.

The implementation process of functions of each module in the above apparatus is detailed in the implementation process of the corresponding steps in the above method. Details are omitted herein for simplicity.

Because the apparatus implementations basically correspond to the method implementations, for related parts, references can be made to partial description of the method implementation. The apparatus implementations described above are merely illustrative, where modules described as separate components can or cannot be physically separated. Components displayed as modules can or cannot be physical modules, that is, the components can be located in one place, or can be distributed to multiple network modules. Some or all of the modules can be selected based on actual needs to achieve the object of the solution of the present specification. A person of ordinary skill in the art can understand and implement the implementations without innovative efforts.

The systems, apparatuses, or modules illustrated in the above implementations can be specifically implemented by computer chips or entities, or by products with certain functions. A typical implementation device is a computer. The computer can be a personal computer, a laptop computer, a cellular phone, a camera phone, a smartphone, a personal digital assistant, a media player, a navigation device, an email sending and receiving device, a game console, a tablet computer, a wearable device, or a combination thereof.

Corresponding to the above implementations of the invoice invalidation method based on a blockchain, the present specification further provides implementations of an electronic device. The electronic device includes a processor and a memory configured to store machine-executable instructions, where the processor and the memory are usually connected to each other by using an internal bus. In other possible implementations, the device can further include an external interface that can be communicated with other devices or components.

In the implementations, by reading and executing the machine-executable instructions stored in the memory and corresponding to control logic for invoice invalidation based on a blockchain, the processor is enabled to: receive an invalidation request that is initiated by an invoice invalidation party for a target invoice recorded in the blockchain; in response to the invalidation request, determine whether the invoice invalidation party has authority to invalidate the target invoice; and in response to that the invoice invalidation party has the authority to invalidate the target invoice, invoke an invoice invalidation logic provided in a smart contract deployed in a blockchain network of the blockchain to invalidate the target invoice.

In the implementations, the smart contract further provides authority verification logic for the invoice invalidation party; and by reading and executing the machine-executable instructions stored in the memory and corresponding to control logic for invoice invalidation based on a blockchain, the processor is enabled to: invoke the authority verification logic provided in the smart contract to determine whether the invoice invalidation party has authority to invalidate the target invoice.

In the implementations, the invalidation request includes a user identifier of the invoice invalidation party; by reading and executing the machine-executable instructions stored in the memory and corresponding to control logic for invoice invalidation based on a blockchain, the processor is enabled to: determine, based on the user identifier, whether the invoice invalidation party is an issuer of the target invoice or a trusted third party; and in response to that the invoice invalidation party is an issuer of the target invoice or a trusted third party, determine that the invoice invalidation party has the authority to invalidate the target invoice.

In the implementations, the invalidation request includes an invoice identifier of the target invoice; by reading and executing the machine-executable instructions stored in the memory and corresponding to control logic for invoice invalidation based on a blockchain, the processor is further enabled to: determine, based on an invoice identifier, whether an invoice corresponding to the invoice identifier is stored in the blockchain; and in response to that the invoice corresponding to the invoice identifier is stored in the blockchain, determine the invoice as the target invoice.

In the implementations, the invoice identifier can include: a hash value obtained through hash calculation based on an invoice content; or a hash value obtained through hash calculation based on a piece of uniqueness information in the invoice content.

In the implementations, by reading and executing the machine-executable instructions stored in the memory and corresponding to control logic for invoice invalidation based on a blockchain, the processor is enabled to: update a state of the target invoice from a valid state to an invalid state.

Corresponding to the above implementations of the invoice invalidation method based on a blockchain, the present specification further provides an implementation of another electronic device. The electronic device includes a processor and a memory configured to store machine-executable instructions, where the processor and the memory are usually connected to each other by using an internal bus. In other possible implementations, the device can further include an external interface that can be communicated with other devices or components.

In the implementations, by reading and executing the machine-executable instructions stored in the memory and corresponding to control logic for invoice invalidation based on a blockchain, the processor is enabled to: obtain a transaction that has been recorded in the blockchain; determine whether the transaction is a refund transaction corresponding to a payment transaction that has been recorded in the blockchain; and in response to that the transaction is a refund transaction corresponding to the payment transaction, invoke an invoice invalidation logic provided in a smart contract deployed in a blockchain network of the blockchain to invalidate a target invoice that is related to the payment transaction and recorded in the blockchain.

In the implementations, the smart contract further provides transaction matching logic; and by reading and executing the machine-executable instructions stored in the memory and corresponding to control logic for invoice invalidation based on a blockchain, the processor is enabled to: invoke the transaction matching logic provided in the smart contract to determine whether the transaction is a refund transaction corresponding to the payment transaction that has been recorded in the blockchain.

In the implementations, by reading and executing the machine-executable instructions stored in the memory and corresponding to control logic for invoice invalidation based on a blockchain, the processor is further enabled to: determine, based on an invoice identifier corresponding to the payment transaction, whether an invoice corresponding to the invoice identifier is stored in the blockchain; and in response to that the invoice corresponding to the invoice identifier is stored in the blockchain, determine the invoice as the target invoice.

In the implementations, the invoice identifier can include: a hash value obtained through hash calculation based on an invoice content; or a hash value obtained through hash calculation based on a piece of uniqueness information in the invoice content.

In the implementations, by reading and executing the machine-executable instructions stored in the memory and corresponding to control logic for invoice invalidation based on a blockchain, the processor is enabled to: update a state of the target invoice that is related to the payment transaction and recorded in the blockchain from a valid state to an invalid state.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 6:
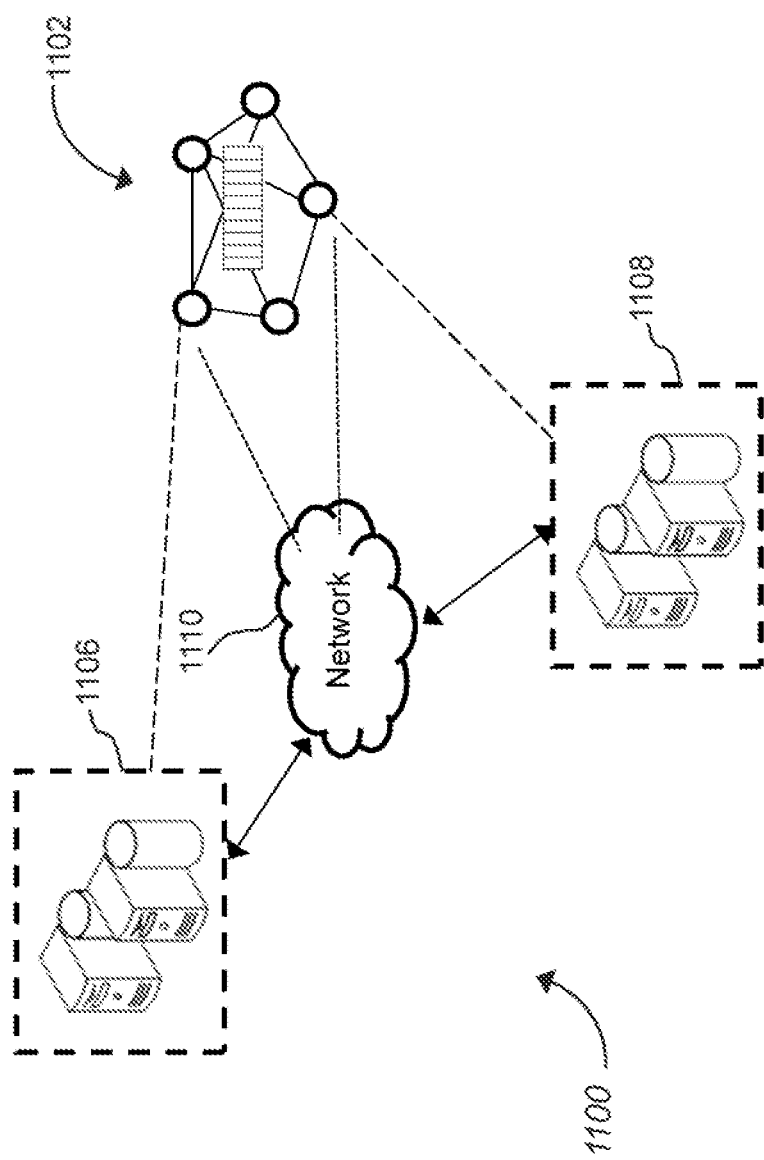
FIG. 6 is a diagram illustrating example environments that can be used to execute embodiments of this specification.

FIG. 6 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 6, the consortium blockchain network 1102 is represented as a peer-to-peer network of nodes, and the computing systems 1106, 1108 provide nodes of the first entity and second entity, respectively, which participate in the consortium blockchain network 1102.

Figure 7:
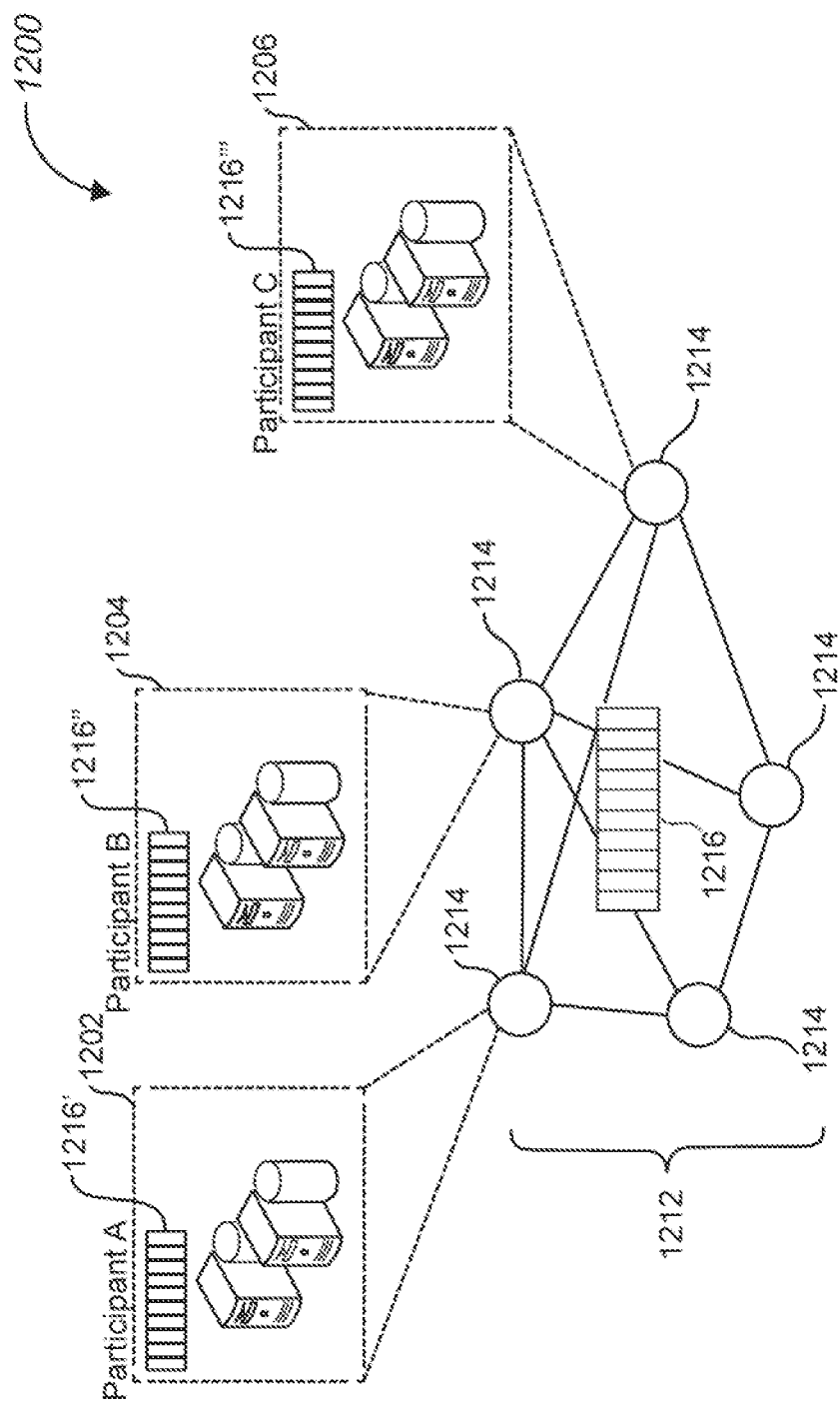
FIG. 7 is a diagram illustrating an example architecture in accordance with embodiments of this specification.

FIG. 7 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 7, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 7, the participant systems 1202, 1204 store respective, complete copies 1216', 1216'', 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes." The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 7, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 7, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 7, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, a logistics management system can be implemented within the blockchain environment 1100 of FIG. 6 and using the blockchain architecture 1200 of FIG. 7. For example, transaction information of a logistic process is stored as blocks in the blockchain 1216.

A person skilled in the art will easily figure out other implementation solutions of the present specification after considering the present specification and practicing the disclosure disclosed herein. The present specification is intended to cover any modification, use or adaptive change of the present specification, and these modifications, uses or adaptive changes follow the general principles of the present specification and include common knowledge or conventional technical means in the technical field not disclosed in the present specification. The present specification and implementations are regarded as example only, with the true scope and spirit of the present specification being indicated by the following claims.

It should be understood that the present specification is not limited to the precise structure already described above and shown in the accompanying drawings, and various modifications and changes can be performed without departing from its scope. The scope of the present specification is limited only by the appended claims.

The above descriptions are merely the preferred implementations of the present specification, and are not intended to limit the present specification. Any modifications, equivalent replacements, improvements, and the like made within the spirit and principles of the present specification should fall within the protection scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. An invoice invalidation method based on a blockchain, comprising:
    receiving an invalidation request that is initiated by an invoice invalidation party for a target invoice recorded in the blockchain;
    in response to the invalidation request, determining whether the invoice invalidation party has authority to invalidate the target invoice; and
    in response to that the invoice invalidation party has the authority to invalidate the target invoice, invoking an invoice invalidation logic provided in a smart contract deployed in a blockchain network of the blockchain to invalidate the target invoice by updating a state of the target invoice from a valid state to an invalid state via a state identifier that is set for the target invoice.

2. The method according to claim 1, wherein:
    the smart contract further provides an authority verification logic for the invoice invalidation party; and
    the determining whether the invoice invalidation party has authority to invalidate the target invoice includes:
        invoking the authority verification logic provided in the smart contract to determine whether the invoice invalidation party has authority to invalidate the target invoice.

3. The method according to claim 1, wherein:
    the invalidation request includes a user identifier of the invoice invalidation party; and
    the determining whether the invoice invalidation party has authority to invalidate the target invoice includes:
        determining, based on the user identifier, whether the invoice invalidation party is an issuer of the target invoice or a trusted third party; and
        in response to that the invoice invalidation party is an issuer of the target invoice or a trusted third party, determining that the invoice invalidation party has the authority to invalidate the target invoice.

4. The method according to claim 1, wherein:
    the invalidation request includes an invoice identifier of the target invoice; and
    the method further includes:
        determining, based on the invoice identifier, whether an invoice corresponding to the invoice identifier is stored in the blockchain; and
        in response to that the invoice corresponding to the invoice identifier is stored in the blockchain, determining the invoice as the target invoice.

5. The method according to claim 4, wherein the invoice identifier includes:
    a hash value obtained through hash calculation based on an invoice content; or a hash value obtained through hash calculation based on a piece of uniqueness information in the invoice content.

6. An invoice invalidation method based on a blockchain, comprising:
   obtaining a transaction that has been recorded in the blockchain;
   determining whether the transaction is a refund transaction corresponding to a payment transaction that has been recorded in the blockchain; and
   in response to the transaction is a refund transaction corresponding to the payment transaction, invoking an invoice invalidation logic provided in a smart contract deployed in a blockchain network of the blockchain to invalidate a target invoice that is related to the payment transaction and recorded in the blockchain by updating a state of the target invoice from a valid state to an invalid state via a state identifier that is set for the target invoice.

7. The method according to claim 6, wherein:
   the smart contract further provides a transaction matching logic; and
   the determining whether the transaction is a refund transaction corresponding to the payment transaction that has been recorded in the blockchain includes:
      invoking the transaction matching logic provided in the smart contract to determine whether the transaction matches the payment transaction that has been recorded in the blockchain.

8. The method according to claim 6, comprising:
   determining, based on an invoice identifier corresponding to the payment transaction, whether an invoice corresponding to the invoice identifier is stored in the blockchain; and
   in response to that the invoice corresponding to the invoice identifier is stored in the blockchain, determining the invoice as the target invoice.

9. The method according to claim 8, wherein the invoice identifier includes:
   a hash value obtained through hash calculation based on an invoice content; or
   a hash value obtained through hash calculation based on a piece of uniqueness information in the invoice content.

10. An electronic device, comprising:
    a processor; and
    a memory storing machine-executable instructions,
    wherein by reading and executing the machine-executable instructions stored in the memory and corresponding to control logic for invoice invalidation based on a blockchain, the processor is enabled to perform acts including:
       receiving an invalidation request that is initiated by an invoice invalidation party for a target invoice recorded in the blockchain;
       in response to the invalidation request, determining whether the invoice invalidation party has authority to invalidate the target invoice; and
       in response to that the invoice invalidation party has the authority to invalidate the target invoice, invoking an invoice invalidation logic provided in a smart contract deployed in a blockchain network of the blockchain to invalidate the target invoice by updating a state of the target invoice from a valid state to an invalid state via a state identifier that is set for the target invoice.

11. The electronic device according to claim 10, wherein:
    the smart contract further provides an authority verification logic for the invoice invalidation party; and
    the determining whether the invoice invalidation party has authority to invalidate the target invoice includes:
       invoking the authority verification logic provided in the smart contract to determine whether the invoice invalidation party has authority to invalidate the target invoice.

12. The electronic device according to claim 10, wherein:
    the invalidation request includes a user identifier of the invoice invalidation party; and
    the determining whether the invoice invalidation party has authority to invalidate the target invoice includes:
       determining, based on the user identifier, whether the invoice invalidation party is an issuer of the target invoice or a trusted third party; and
       in response to that the invoice invalidation party is an issuer of the target invoice or a trusted third party, determining that the invoice invalidation party has the authority to invalidate the target invoice.

13. The electronic device according to claim 10, wherein:
    the invalidation request includes an invoice identifier of the target invoice; and
    the acts further include:
       determining, based on the invoice identifier, whether an invoice corresponding to the invoice identifier is stored in the blockchain; and
       in response to that the invoice corresponding to the invoice identifier is stored in the blockchain, determining the invoice as the target invoice.

14. The electronic device according to claim 13, wherein the invoice identifier includes:
    a hash value obtained through hash calculation based on an invoice content; or
    a hash value obtained through hash calculation based on a piece of uniqueness information in the invoice content.

15. An electronic device, comprising:
    a processor; and
    a memory storing machine-executable instructions,
    wherein by reading and executing the machine-executable instructions stored in the memory and corresponding to control logic for invoice invalidation based on a blockchain, the processor is enabled to perform acts including:
       obtaining a transaction that has been recorded in the blockchain;
       determining whether the transaction is a refund transaction corresponding to a payment transaction that has been recorded in the blockchain; and
       in response to the transaction is a refund transaction corresponding to the payment transaction, invoking an invoice invalidation logic provided in a smart contract deployed in a blockchain network of the blockchain to invalidate a target invoice that is related to the payment transaction and recorded in the blockchain by updating a state of the target invoice from a valid state to an invalid state via a state identifier that is set for the target invoice.

16. The electronic device according to claim 15, wherein:
    the smart contract further provides a transaction matching logic; and
    the determining whether the transaction is a refund transaction corresponding to the payment transaction that has been recorded in the blockchain includes:
       invoking the transaction matching logic provided in the smart contract to determine whether the transaction matches the payment transaction that has been recorded in the blockchain.

17. The electronic device according to claim 15, wherein the acts include:
   determining, based on an invoice identifier corresponding to the payment transaction, whether an invoice corresponding to the invoice identifier is stored in the blockchain; and
   in response to that the invoice corresponding to the invoice identifier is stored in the blockchain, determining the invoice as the target invoice.

18. The electronic device according to claim 17, wherein the invoice identifier includes:
   a hash value obtained through hash calculation based on an invoice content; or
   a hash value obtained through hash calculation based on a piece of uniqueness information in the invoice content.

\* \* \* \* \*